(12) United States Patent
Sollacher

(10) Patent No.: US 10,171,625 B2
(45) Date of Patent: Jan. 1, 2019

(54) COMMUNICATIONS NETWORK AND METHOD FOR TRANSMITTING DATA IN A COMMUNICATIONS NETWORK

(71) Applicant: SIEMENS AKTIENGESELLSCHAFT, Munich (DE)

(72) Inventor: Rudolf Sollacher, Eching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/857,703

(22) Filed: Dec. 29, 2017

(65) Prior Publication Data

US 2018/0124206 A1    May 3, 2018

Related U.S. Application Data

(63) Continuation of application No. 14/365,831, filed as application No. PCT/EP2012/074193 on Dec. 3, 2012.

(30) Foreign Application Priority Data

Dec. 16, 2011  (DE) .................. 10 2011 088 884

(51) Int. Cl.
*H04L 29/08*    (2006.01)
*H04W 72/04*    (2009.01)
(Continued)

(52) U.S. Cl.
CPC ............ *H04L 67/325* (2013.01); *H04L 67/12* (2013.01); *H04W 56/001* (2013.01);
(Continued)

(58) Field of Classification Search
CPC ....... H04L 29/08; H04L 67/325; H04L 67/12; H04W 56/00; H04W 72/04; H04W 84/18;
(Continued)

(56) References Cited

U.S. PATENT DOCUMENTS 7,457,299 B2   11/2008  Fette et al.
7,656,801 B1    2/2010  Rockwood .......... H04L 63/1441
                                                       370/235
(Continued)

FOREIGN PATENT DOCUMENTS

DE   102010042256 A1   4/2012
JP     2006094229 A    4/2006
(Continued)

OTHER PUBLICATIONS

Olfati-Saber R. et al: "Belief Consensus and Distributed Hypothesis Testing in Sensor Networks", Networked Embedded Sensing and Control: Workshop NESC'05, University of Notre Dame, USA, Oct. 2005 Proceedings, Springer-Verlag New York Inc.
(Continued)

*Primary Examiner* — Chirag G Shah
*Assistant Examiner* — Joshua Smith
(74) *Attorney, Agent, or Firm* — Laurence Greenberg; Werner Stemer; Ralph Locher

(57) ABSTRACT

A method transmits data in a communications network containing a plurality of nodes. The transmission of suitable configuration data between a node and its neighboring node ensures that the time slots used for the data transmission are used only by one node, thus preventing collision. The method is preferably used in wireless sensor networks, in which the individual sensor nodes exchange data between one another. The method guarantees reliable data transmission with low energy consumption by the individual sensor nodes. The method can be combined with a decentralized pattern detection, for which mean values are decentrally determined in a suitable manner in the individual nodes via protocols known per se, particularly via a consensus protocol or via a tree aggregation protocol. The method is used
(Continued)

particularly in a communications network for an automation system or a power network or a transport network.

28 Claims, 2 Drawing Sheets

(51) Int. Cl.
*H04W 56/00* (2009.01)
*H04W 84/18* (2009.01)

(52) U.S. Cl.
CPC ... *H04W 72/0406* (2013.01); *H04W 72/0446* (2013.01); *H04W 56/00* (2013.01); *H04W 84/18* (2013.01)

(58) Field of Classification Search
CPC ......... H04W 72/0406; H04W 72/0446; H04W 56/001
See application file for complete search history.

(56) References Cited

U.S. PATENT DOCUMENTS

| | | | |
|---|---|---|---|
| 8,260,307 | B2 | 9/2012 | Halfmann et al. |
| 2001/0012757 | A1 | 8/2001 | Boyle |
| 2002/0091846 | A1 | 7/2002 | Garcia-Luna-Aceves ............ H04L 12/18 709/230 |
| 2003/0067892 | A1 | 4/2003 | Beyer et al. |
| 2005/0007987 | A1 | 1/2005 | Yagi ............ H04B 7/2615 370/347 |
| 2005/0025180 | A1 | 2/2005 | Curcio et al. |
| 2005/0243765 | A1 | 11/2005 | Schrader et al. |
| 2007/0036089 | A1 | 2/2007 | Metke ............ H04W 72/082 370/254 |
| 2008/0123619 | A1 | 5/2008 | Ko ............ H04W 74/006 370/345 |
| 2009/0103501 | A1 | 4/2009 | Farrag ............ H04W 74/02 370/337 |
| 2009/0135833 | A1 | 5/2009 | Lee ............ H04L 12/4645 370/395.53 |
| 2009/0141676 | A1* | 6/2009 | Maheshwari ......... H04L 1/1812 370/329 |
| 2011/0116421 | A1 | 5/2011 | Guo |

FOREIGN PATENT DOCUMENTS

| | | |
|---|---|---|
| RU | 2273964 C2 | 4/2006 |
| RU | 2337505 C2 | 10/2008 |
| WO | 2005032055 A2 | 4/2005 |

OTHER PUBLICATIONS

Barbarossa S. et al: "Decentralized Maximum-Likelihood Estimation for Sensor Networks Composed of Nonlinearly Coupled Dynamical Systems", IEEE Transactions on Signal Processing 55 (Jul. 2007), No. 7, Part 1, 3456-3470, http://dx.doi.org/10.1109/TSP.2007.893921.—DOI 10.1109/TSP.2007.893921.

Xiao L.: "Decomposition and Fast Distributed Iterations for Optimization of Networked Systems", Stanford University, Dissertation, Jun. 2004.

Rowe A. et al: "RT-Link: A global time-synchronized link protocol for sensor networks", Science Direct, Ad Hoc Networks 6 (2008), pp. 1201-1220.

Kredo K. II et al: "Medium Access control in wireless sensor networks" Science Direct, Computer Networks 51 (2007), pp. 961-994.

Incel O. D. et al.: "MC-LMAC: A multi-channel MAC protocol for wireless sensor networks" Ad Hoc Networks, Elsevier, Amsterdam; vol. 9; No. 1; pp. 73-94; ISSN: 1570-8705; XP027219153; 2011; NL; Jan. 1, 2011.

Bachir A. et al: "MAC Essentials for Wireless Sensor Networks" IEEE Communications Surveys, IEEE New York; vol. 12; No. 2; pp. 222-248; ISSN: 1553-877X; DOI: 10.1109/SURV.2010.020510.00058; XP011334494; US; Apr. 1, 2010.

* cited by examiner

COMMUNICATIONS NETWORK AND METHOD FOR TRANSMITTING DATA IN A COMMUNICATIONS NETWORK

CROSS-REFERENCE TO RELATED APPLICATION

This application is a continuation of patent application Ser. No. 14/365,831, filed Jun. 16, 2014; which was a § 371 national stage filing of international application No. PCT/EP2012/074193, filed Dec. 3, 2012, which designated the United States; this application also claims the priority, under 35 U.S.C. § 119, of German patent application No. DE 10 2011 088 884.5, filed Dec. 16, 2011; the prior applications are herewith incorporated by reference in their entirety.

BACKGROUND OF THE INVENTION

Field of the Invention

The invention relates to a method for transmitting data in a communications network comprising a plurality of nodes and to a corresponding communications network.

In communications networks comprising a plurality of nodes such as, e.g., in wireless sensor networks, the need often exists that the data acquired by the individual nodes are reliably conveyed to neighboring nodes within communication range of the respective node. Since each node only knows some of the nodes of the network, conflicts may arise in this context resulting in two nodes which are not within communication range with respect to one another transmitting data at the same time to the same node, which leads to collisions and to the loss of these data.

In communications networks, a central entity in the form of a gateway or a central controller is frequently used in which the data from all nodes are collected. In this arrangement, however, it is disadvantageous that the data transmission collapses when the central entity fails and, furthermore, the communication load of the individual nodes towards the central entity increases so that nodes within the spatial or topological vicinity of the central entity impair the life and the performance of the network.

SUMMARY OF THE INVENTION

It is the object of the invention, therefore, to create a method by means of which data can be transmitted in a simple and reliable manner in a communications network between nodes.

This object is achieved by the method and the communications network as claimed in the independent claims. Further developments of the invention are defined in the dependent claims.

In the method according to the invention, one or more successive intervals are specified on the basis of a time synchronized for all nodes of the communications network, which intervals in each case comprise a group of first time slots and a group of second time slots, wherein the first time slots can be utilized for data transmission by every node and the second time slots can be reserved by respective nodes in order to be utilized for data transmission by the respective node. In a preferred embodiment, the first time slots are CSMA time slots known per se (CSMA=Carrier Sense Multiple Access) which can be utilized by any node if the time slot is not yet occupied by another node. By comparison, the second time slots are preferably TDMA time slots known per se (TDMA=Time Division Multiple Access) which are suitably reserved exclusively for particular nodes or data transmissions.

Within the context of the method according to the invention, a respective node in the communications network determines whether and/or which neighboring nodes within its communication range have reserved second time slots. From this information, the respective node generates coordination data (e.g. coordination packets) according to which a second time slot is reserved by the respective node which is not reserved by neighboring nodes. Furthermore, the coordination data contain the information as to whether and/or which second time slots are reserved several times by neighboring nodes. This multiple occupancy can occur when, although two neighboring nodes are within communication range from the node currently considered, they are not within communication range with one another.

According to the invention, a respective node sends the coordination data generated by it to its neighboring nodes within a first time slot, wherein the respective neighboring nodes which have reserved the same second time slot according to the coordination data reserve a new second time slot, no reservation of which by another node is known thereto. Subsequently, data are sent out by the respective nodes which have reserved the corresponding second time slots within the second time slots.

The method according to the invention provides for a decentralized time slot allocation without collisions in a simple manner by means of self organization of the nodes, so that data can be transmitted reliably between a node and its neighboring node. In this context, the method can be used in arbitrary communications networks and especially in wireless communications networks. The method is used preferably in wireless sensor networks in which at least some of the nodes comprise sensors which communicate wirelessly with one another in order to exchange, e.g., sensed measurement values by this means. The method according to the invention can be used in arbitrary technical fields of application. As an example, the method can be used in a communications network for an automation plant, e.g. for production automation or process automation, and/or for a power system and/or for a traffic network. In such fields of application, it is often necessary to exchange data between the nodes via a decentralized organization of the network.

In a particularly preferred embodiment of the method according to the invention, the nodes perform a decentralized time synchronization for determining the synchronized time, on the basis of which the time slots are specified. In this context, methods, known per se, for decentralized time synchronization can be used, such as, e.g., the method described in German patent application 10 2010 042 256.8. The entire content of disclosure of this application is incorporated in the content of the present application by means of reference.

In a further, particularly preferred embodiment, a second time slot is reserved for a broadcast transmission by a respective node in accordance with the coordination data generated by the respective node.

In particular applications, particularly in the case of a data transmission according to a consensus protocol, the data transmission between a node and a neighboring node should be symmetric, i.e. if a node sends data to a neighboring node, these neighboring nodes should also send data back to the node. If this is not the case, the corresponding data should not be processed further. To achieve this, in a preferred embodiment a second time slot is reserved for a predetermined link between a respective node and a predetermined neighboring node according to the coordination data generated by the respective node, both first data being transmitted by the respective node to the predetermined neighboring node and second data by the predetermined neighboring node to the respective node within this second time slot, wherein, in the case where the transmission of the first and/or second data is not successful, the first and second data are discarded. According to this embodiment, it is extensively ensured that data are always transmitted symmetrically between nodes and neighboring nodes on the corresponding links. The establishment of whether the data transmissions were successful can be achieved, e.g., via a corresponding confirmation which is sent out in response to the reception of the first and second data, respectively, by the respective node.

In a further preferred embodiment of the invention, at least one parameter value is determined in the respective nodes which is specific for the respective node. One such parameter value can be, e.g., a measurement value or be based on a measurement value which is detected by the node or a sensor in the node, respectively. As part of the data transmission between the nodes, these parameter values or, respectively, data based on these parameter values can be transmitted. In this context, in particular, parameter values updated in each new interval are determined and transmitted.

In a particularly preferred embodiment, the data transmitted in the second time slots are determined and processed on the basis of a protocol in such a manner that the mean value of the parameter values of all nodes is estimated in each node. Such protocols are sufficiently well known from the prior art and provide for an estimation of the mean value in each node without the parameter values of all other nodes having to be known in the respective nodes. Instead, it is sufficient that the respective node can exchange data directly only with some of the nodes of the network. In one variant of the invention, a consensus protocol, known per se, or possibly also a tree aggregation protocol which is also previously known is used as protocol for averaging the parameter values.

In a further variant, the data transmission method according to the invention is utilized for the purpose that, based in a decentralized manner on status values which are in each case present locally in a node and are preferably acquired in the respective nodes, a pattern represented by all status values of the nodes is recognized from a plurality of patterns in each node on the basis of the mean value of the parameter values which is made known by means of a suitable protocol. This decentralized pattern recognition is preferably implemented in such a manner that, in each node, the multiplicity of patterns is deposited with in each case a probability which specifies how probable a status variable present locally in the respective node is in dependence on the respective pattern. In particular, in this context, the logarithms of the probabilities are determined as parameter values in the respective node for the status variable present locally in the respective node with the presence of the respective patterns. In this context, the probability with which each pattern is represented by the status variables present locally in all nodes is determined in each node via the mean value of the logarithms for a respective pattern. The pattern having the highest probability then represents the detected pattern.

Apart from the method described above, the invention also relates to a communications network comprising a plurality of nodes which are designed in such a manner that the method according to the invention or, respectively, one or more variants of the method according to the invention can be carried out in the operation of the communications network.

BRIEF DESCRIPTION OF THE SEVERAL VIEWS OF THE DRAWING

In the text which follows, exemplary embodiments of the invention are described in detail with reference to the attached figures, in which.

DETAILED DESCRIPTION OF THE INVENTION

Figure 1:
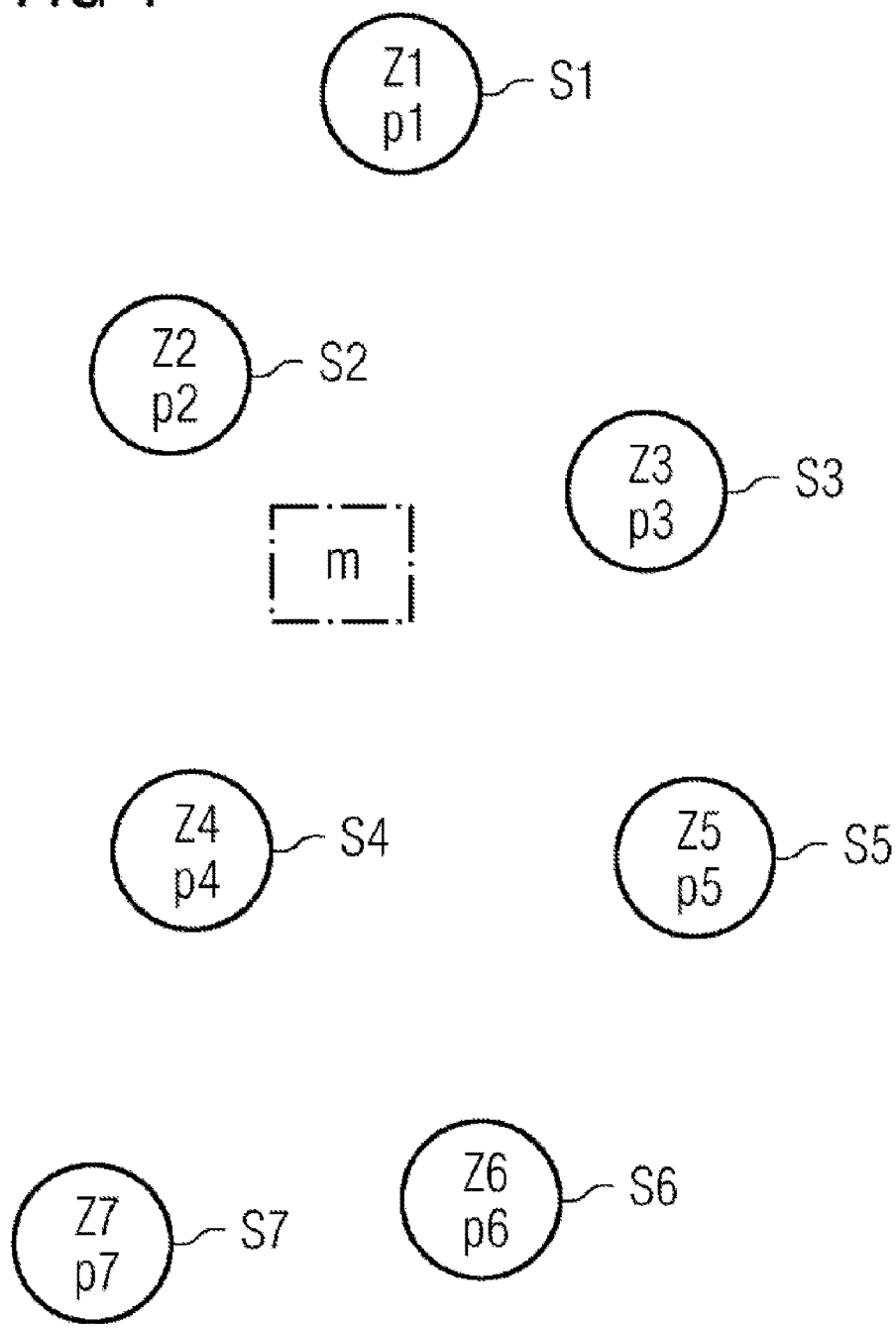
FIG. 1 shows a diagrammatic representation of a communications network in the form of a wireless sensor network in which an embodiment of the method according to the invention is carried out.

In the text which follows, the invention will be described on the basis of a communication in a wireless sensor network, FIG. 1 showing by way of example such a sensor network. The sensor network comprises seven sensor nodes S1, S2, . . . , S7, which can exchange data with one another via a suitable wireless protocol. In this context, a respective sensor node only knows particular number of neighboring nodes in its environment due to the limited communication range of the wireless transmission. In the scenario of FIG. 1, the node S1 only knows, e.g., nodes S2 and S3 and not the remaining nodes. Similarly, certain other nodes may know particular nodes in their neighborhood but not the node S1. The wireless sensor network operates in a completely decentralized manner, i.e. there is no central entity to which corresponding data which are detected by the individual sensor nodes can be transmitted. The aim of the embodiment, described here, of the method according to the invention is then to detect in each individual node a pattern of a system status of the entire network, although a respective node only knows some of its neighboring nodes. To achieve this, a consensus protocol is used which is described below. In this context, however, it must be ensured that each individual sensor node transmits its data reliably to its neighboring nodes.

In the scenario of FIG. 1, each sensor node detects at regular time intervals a measurement value, e.g. a temperature value or a brightness value, these measurement values being designated by $z1, z2, \ldots, z6$ for the individual sensor nodes. In the embodiment described here, the measurement value represents a brightness value which can be divided into the "bright" class or into the "dark" class. Thus, a pattern in the form of the corresponding states "bright" or "dark" of the individual sensors is represented by all sensor measurement values. This pattern represents the abovementioned system status which is designated in FIG. 1 by m for illustration. In this context, a multiplicity of patterns exists for each possible combination of bright or dark values of the individual sensors. For each pattern in this case, a value $p1, p2, \ldots, p7$ is deposited in the respective nodes which, in dependence on the respective pattern m, specifies the probability with which a corresponding brightness value $z1, z2, \ldots, z6$ is measured in the respective sensor nodes S1, S2, . . . , S6. As will be described below, estimations are calculated for the probability of a pattern m in dependence on the measured brightness values of all nodes via a consensus protocol. The pattern having the highest probability value then represents the pattern detected in a decentralized manner.

Figure 2:
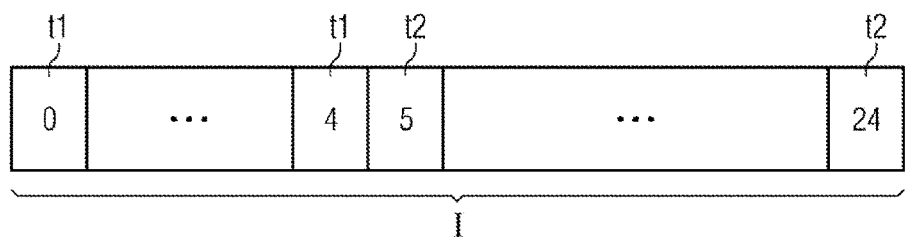
FIG. 2 shows the representation of an interval of first and second time slots in which data are transmitted on the basis of a variant of the method according to the invention.

In order to guarantee a reliable transmission of data between neighboring sensor nodes, the timing arrangement represented in FIG. 2 is used in the embodiment described here. FIG. 2 shows a time interval I which is passed successively as part of the method according to the invention, updated data of the respective nodes being sent out in each time interval. The time interval comprises first time slots t1 which are the first five slots from 0 to 4 in FIG. 2. Furthermore, the interval I comprises second time slots t2 which are the slots 5 to 24 in FIG. 2. In one implementation of the method according to the invention, the time slots have a length of 20 ms in each case. In this context, the time slots t1 are so-called CSMA time slots (CSMA=Carrier Sense Multiple Access), according to which each node can listen to the radio channels and send data via a free radio channel. By comparison, the time slots t2 are TDMA time slots (TDMA=Time Division Multiple Access) which are reserved suitably for data transmission by the respective nodes. In a preferred variant here, the data transmission takes place at the physical layer based on the IEEE 802.15.4 Standard known per se.

In order to implement the data transmission according to the intervals I, the times of the individual sensor nodes are synchronized, wherein a method known in the prior art can be used for synchronization, such as, e.g., the method described in German patent application 10 2010 042 256.8. As part of this method, a protocol is used by means of which the estimated global network time is exchanged in packet headers. The protocol reduces the adaptation rate of the sensor nodes which are already synchronized with their neighbors, as a result of which the effects of errors of sensor nodes newly added are reduced. Furthermore drifts in the clocks of the sensors are compensated for. When a timer with a 32 kHz clock frequency is used, the synchronization error for the protocol used lies within a range of about 30 μs and is significantly smaller than the length of one time slot in the intervals I. The starting times and the sequence numbers for the time slots are established on the basis of the synchronized time.

In order to allocate time slots for the consensus protocol described below, the individual sensor nodes transmit special coordination data in the form of coordination packets within the first five time slots t1 of the interval I. With these packets, the nodes load a second time slot not reserved by other nodes and, in doing so, at the same time transmit a list of the second time slots which are occupied by more than one neighboring node in their environment. Such multiple occupancies can occur when a sensor node is added to the sensor network which sees two neighboring nodes in its environment which are not within range of one another. On the basis of the coordination packets transmitted within the first time slots, the corresponding neighboring nodes can select time slots which are not reserved by direct neighbors and for which no allocation conflict is known in the case of multiple occupancies. To save energy, the individual sensor nodes switch to an energy saving mode in all time slots apart from the first five time slots of the interval I and the time slots in which they send out, or receive from their neighbors, data by broadcast.

To achieve reliable estimation of the system status on the basis of the consensus protocol described below, it should be ensured that each sensor node which sends data to a neighboring node also receives data from this neighboring node. That is to say the links between the sensor nodes should be symmetric. In a development of the method according to the invention, the data are therefore not transmitted by a broadcast between the sensor nodes, but a unicast is used with a three-way communication. In this context, a sensor node sends in a corresponding second time slot an enquiry to a predetermined neighboring node in which, apart from a specification of the interval I, it reports its estimated value determined as part of the consensus protocol. When the neighboring node receives this enquiry, it responds analogously with the estimated value determined thereby. If this response is received by the original node, the latter responds with a confirmation. If this confirmation is then received by the neighboring node, the link is symmetric. If the neighboring node does not receive the enquiry, it will also not send a return response so that the link remains symmetric. If the neighboring node receives the enquiry but its response is lost, the neighboring node will also not receive a confirmation from the original node with the consequence that it discards the enquiry of the original node. It is only when the confirmation is not received by the neighboring node as part of the three-way communication that the link can be asymmetric, since in this case only the neighboring node discards the data transmitted thereto. The corresponding node repeats the procedure just described in the current time slot with all its neighboring nodes apart from those which have already previously completed the three-way communication successfully in the current interval I.

In the text which follows, the consensus protocol already mentioned above will now be described. By means of this protocol, a mean-value estimation is carried out via the local data exchange of one node with its neighboring node, and via this means a pattern m is detected in a decentralized manner. It is assumed that each sensor node n, which corresponds to one of the nodes S1 to S7 in FIG. 1, measures a value $\hat{z}_n$ which corresponds to the corresponding parameters z1, z2 etc. of FIG. 1. During a classification, the binary value 1 is assigned to each measurement value with a probability of $\sigma(\hat{z}_n|w)$ and the binary value 0 with a complementary probability of $1-\sigma(\hat{z}_n|w)$. In the abovementioned scenario of brightness values, the binary value 1 then corresponds, e.g., to the status of "bright" and the binary value 0, e.g., to the status of "dark". A parameter vector $w=(w_1, w_2)$ specifies the corresponding probability function which is deposited in each of the nodes and is designated by p1, p2, etc. in FIG. 1. For example, this probability function can be given for the sensor node n by the logistic function $\sigma(\hat{z}_n|w)=1/(1+\exp(-(\hat{z}_n-w_1)/w_2))$.

The probability for particular bit pattern m (e.g. 1101 in the case of four sensors) is now to be determined via a pattern recognition with the assumption of the sensor values $\hat{z}_n$. This probability is given by the following equation (see also printed document [1]):

$$p(m|\hat{z}_1, \ldots, \hat{z}_N) = \frac{p(\hat{z}_1, \ldots, \hat{z}_N|m)p_m}{\sum_{m'} p(\hat{z}_1, \ldots, \hat{z}_N|m')p_{m'}} = \frac{\prod_{i=1}^{N}(p_i(\hat{z}_i|m))p_m}{\sum_{m'}\prod_{i=1}^{N}(p_i(\hat{z}_i|m'))p_{m'}} \quad (1)$$

$$p_i(\hat{z}_i|m) = \begin{cases} \sigma(\hat{z}_n|w), & \text{bit}_i(m) = 1 \\ 1-\sigma(\hat{z}_n|w), & \text{bit}_i(m) = 0 \end{cases}$$

In this context, it is assumed implicitly that the measurements of the different sensors are statistically independent for the given pattern. N designates the total number of all sensors in the network. $p_{m'}$ corresponds to an a priori probability distribution, which may be present, for the pattern m'. Without prior knowledge, this probability is set to 1/M, as a rule, M representing the total number of possible patterns.

The product in the above equation (1) can be modified by forming the logarithms of the probabilities as follows:

$$\prod_{i=1}^{N} p_i(\hat{z}_i \mid m) = \exp\left(N \frac{1}{N} \sum_{i=1}^{N} \ln(p_i(\hat{z}_i \mid m))\right) \quad (2)$$

This mean value in the exponent can now be determined on the basis of the consensus protocol which only needs the local information exchange with neighboring sensor nodes. If it is assumed that each sensor node knows a number of neighboring nodes K in the network and furthermore the possible patterns in each node are known, each sensor node can determine the probability for each pattern without the sensed measurement values $\hat{z}_i$ having to be distributed in the entire network or a central calculation having to be carried out. As a result, the pattern which has the highest probability is finally detected in each node.

In the variant of the method according to the invention, described here, a typical consensus protocol known from the prior art for data transmission and local mean-value estimation of the logarithms is used. According to this protocol, a local estimation of the mean value is initialized in each node with a local calculation based on the measured sensor value, i.e. with the logarithm of the probabilities $p_i(\hat{z}_i|m)$ of the respective patterns. The local estimations are exchanged iteratively with the neighboring nodes until a convergence criterion is reached. The algorithmic implementation used for this purpose is based on the following equation:

$$x_i(t+1) = x_i(t) + \sum_k w_{ik}(t)(x_k(t) - x_i(t)) \quad (3)$$

$$w_{ik}(t) = \begin{cases} a_{ik}(t) > 0, & \text{if } i \text{ has a link with } k \\ 0 & \text{else} \end{cases}$$

In this context, $x_i(t)$ designates the estimation of the mean value of the sensor node i. The couplings $\alpha_{ik}(t)$ can be time-dependent weights for each existing link to a neighbor. In this context, a suitable specification of the couplings is described in printed document [2]. If necessary, other concensus protocols can also be used for forming the mean value, e.g. the protocol described in printed document [3].

Instead of a consensus protocol, a tree aggregation protocol can also be used for the decentralized determination of the mean values, if necessary. In this context, a node in the network acts as root node in which the data of all other nodes, which lastly arrive in aggregated form, are summed and then the mean value is formed. In this context, a tree structure having the root node as root and corresponding parent and child nodes is specified by means of methods known per se. All other nodes apart from the root node collect the aggregated measurement value sums and measurement value quantities as part of the tree aggregation protocol from their child nodes, add these measurement value sums and their measurement value or the measurement value quantities and one and forward the new values to their respective parent nodes. In this manner, the mean value of the measurement values which subsequently can be distributed again in the reverse direction to the nodes in the tree is then obtained in the root node. The data transmission then takes place analogously to the above consensus method based on the TDMA time slots t2 which are allocated suitably within the CSMA time slots by the nodes.

During the initialization of the method according to the invention, configuration data, particularly the plurality of the patterns m described above, must be distributed initially to all nodes in the network. This is achieved by means of a dissemination protocol, known per se, in a preferred embodiment of the invention.

Figure 3:
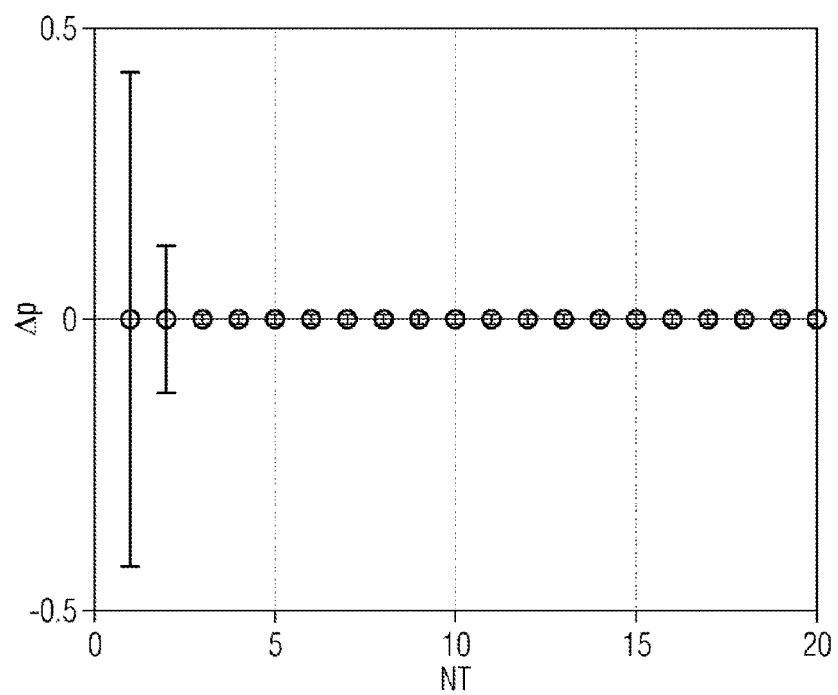
FIG. 3 shows a diagram which illustrates the accuracy of a mean-value estimation based on one embodiment of the invention.

The method according to the invention has been tested on the basis of a network of four sensor nodes. For this purpose, data were considered from 129 pattern detections. On the basis of these data, the correct probabilities were determined for three predetermined patterns on the basis of the above equation (1). These probabilities were compared with probabilities which had been estimated with an implementation of the method according to the invention for the four sensor nodes. In FIG. 3, the error statistics for these probabilities are shown. In this context, the corresponding number NT of the intervals I already passed is reproduced along the abscissa. The difference $\Delta p$ between the probability estimated according to the invention and the actual probability is represented with corresponding standard deviation along the ordinate. It can be seen that the protocol used converges very rapidly to a very low mean error (approximately $-7.3 \times 10^{-6}$) after passing through a few intervals I. The standard deviation converges at $7.3 \times 10^{-3}$.

The embodiment of the invention described in the preceding text has a number of advantages. The decentralized allocation of time slots enables the corresponding communications network itself to organize the media access without using a central entity. By using a consensus or tree aggregation protocol, a decentralized determination of mean values is achieved, wherein a node only needs to know the nodes within its vicinity for this purpose. On the basis of a decentralized mean-value formation, a pattern recognition can be carried out during this process. The communication effort is distributed relatively uniformly to all network nodes. When using battery-operated sensor nodes, the demands on energy storage in the individual nodes are thus lowered.

The invention claimed is:

1. A method for transmitting data in a communications network containing a plurality of nodes, which comprises the steps of:
  specifying at least one interval on a basis of a synchronized time synchronized for all of the nodes, the interval containing a group of first time slots and a group of second time slots, wherein the first time slots being utilized for data transmission by every node and the second time slots being reserved by respective ones of the nodes in order to be utilized for data transmission by the respective nodes;
  determining, via a respective node, whether and/or which neighboring nodes within communication range have reserved the second time slots and generates from this coordination data according to which a second time slot is reserved by the respective node which is not reserved by neighboring nodes, and the coordination data furthermore containing information as to whether and/or which of the second time slots are reserved several times by the neighboring nodes;

sending out, via the respective node, the coordination data generated by the respective node to the neighboring nodes of the respective node within a first time slot, wherein each neighboring node with the second time slots reserved several times according to the coordination data reserves a new second time slot, no reservation of which by another node is known thereto;

sending out the data by the respective nodes which have reserved corresponding second time slots within the second time slots;

reserving one of the second time slots for a predetermined link between the respective node and a predetermined neighboring node according to the coordination data generated by the respective node, first data being transmitted by the respective node to the predetermined neighboring node and second data being transmitted by the predetermined neighboring node to the respective node within the second time slot; and establishing that the transmission of the first data, the second data, or the first data and the second data is not successful in response to not receiving a confirmation that the first data, the second data, or the first data and the second data have been received;

wherein, in a case where the transmission of the first data, the second data or the first and second data is established to be not successful due to not receiving the confirmation, the first data is discarded by the predetermined neighboring node and the second data is discarded by the respective node.

2. The method according to claim 1, wherein the nodes perform a decentralized time synchronization for determining the synchronized time.

3. The method according to claim 1, which further comprises reserving one of the second time slots for a broadcast transmission by the respective node in accordance with the coordination data generated by the respective node.

4. The method according to claim 1, which further comprises determining at least one parameter value in the respective nodes which is specific for the respective node.

5. The method according to claim 4, which further comprises determining the data transmitted in the second time slots and processing the data determined on a basis of a protocol in such a manner that a mean value of parameter values of all the nodes is estimated in each of the nodes.

6. The method according to claim 5, which further comprises selecting the protocol from the group consisting of a consensus protocol, a tree aggregation protocol, and both the consensus protocol and the tree aggregation protocol.

7. The method according to claim 5, wherein based in a decentralized manner on status values which are present locally in the respective nodes and are acquired in the respective nodes, a pattern represented by all the status values of the nodes is recognized from a plurality of patterns in each of the nodes on a basis of the mean value of the parameter values.

8. The method according to claim 7, wherein, in each of the nodes, depositing the multiplicity of patterns with in each case a probability which specifies how probable a status variable present locally in the respective node is in dependence on a respective one of the patterns.

9. The method according to claim 8, which further comprises determining logarithms of probabilities as parameter values in the respective node for the status variable present locally in the respective node with the presence of the respective patterns, and the probability with which each pattern is represented by the status variables present locally in all of the nodes is determined in each of the nodes via the mean value of the logarithms for a respective pattern, wherein the respective pattern having a highest probability represents a detected pattern.

10. The method according to claim 1, wherein the first time slots are carrier sense multiple access time slots and the second time slots are time division multiple access time slots.

11. The method according to claim 1, wherein the communications network is a wireless communications network in which the nodes contain at least partially sensors which communicate with one another wirelessly.

12. The method according to claim 1, wherein the method is used in a communications network for an automation plant, a power system, a traffic network or a combination of the automation plant, the power plant and the traffic network.

13. The method according to claim 1, wherein the communications network is a wireless sensor network in which the nodes contain at least partially sensors which communicate with one another wirelessly.

14. The method according to claim 1, wherein the respective node and the predetermined neighboring node are each a sensor node sensing at least one quality selected from the group consisting of a temperature and a brightness.

15. A communications network, comprising:
a plurality of nodes configured such that during an operation of the communications network:
at least one interval is specified on a basis of a synchronized time synchronized for all of said nodes, said interval contains a group of first time slots and a group of second time slots, wherein the first time slots can be utilized for data transmission by every one of said nodes and the second time slots can be reserved by said nodes to be utilized for data transmission by said nodes;
each of said nodes determining whether and/or which neighboring nodes within communication range have reserved the second time slots and generates from this coordination data according to which a second time slot is reserved by a respective node of said nodes which is not reserved by said neighboring nodes, and the coordination data furthermore contain information as to whether and/or which of the second time slots are reserved several times by said neighboring nodes;
said respective node sending out the coordination data generated by said respective node to said neighboring nodes within said first time slot, wherein each of said neighboring nodes with said second time slots reserved several times according to the coordination data reserves a new second time slot, no reservation of which by another node is known thereto;
data are sent out by said nodes which have reserved corresponding second time slots within the second time slots;
one of the second time slots is reserved for a predetermined link between the respective node and a predetermined neighboring node according to the coordination data generated by the respective node, first data is transmitted by the respective node to the predetermined neighboring node and second data is transmitted by the predetermined neighboring node to the respective node within the second time slot; and
it is established that the transmission of the first data, the second data, or the first data and the second data is not successful in response to not receiving a confirmation that the first data, the second data, or the first data and the second data have been received;

wherein, in a case where the transmission of the first data, the second data or the first and second data is established to be not successful due to not receiving the confirmation, the first data is discarded by the predetermined neighboring node and the second data is discarded by the respective node.

16. The communications network according to claim 15, wherein said nodes perform a decentralized time synchronization for determining the synchronized time.

17. The communications network according to claim 15, wherein the communications network further configured to reserve one of the second time slots for a broadcast transmission by said respective node in accordance with the coordination data generated by said respective node.

18. The communications network according to claim 15, wherein the communications network further configured to determine at least one parameter value in said respective node which is specific for said respective node.

19. The communications network according to claim 18, wherein the communications network further configured to determine the data transmitted in the second time slots and processing the data determined on a basis of a protocol in such a manner that a mean value of parameter values of all said nodes is estimated in each of said nodes.

20. The communications network according to claim 19, wherein the communications network further configured to select the protocol from the group consisting of a consensus protocol, a tree aggregation protocol, and both the consensus protocol and the tree aggregation protocol.

21. The communications network according to claim 19, wherein based in a decentralized manner on status values which are present locally in said respective nodes and are acquired in said respective nodes, a pattern represented by all the status values of said nodes is recognized from a plurality of patterns in each of said nodes on a basis of the mean value of the parameter values.

22. The communications network according to claim 21, wherein, in each of said nodes, depositing the multiplicity of patterns with in each case a probability which specifies how probable a status variable present locally in said respective node is in dependence on a respective one of the patterns.

23. The communications network according to claim 21, wherein the communications network further configured to determine logarithms of probabilities as parameter values in said respective node for the status variable present locally in said respective node with the presence of the respective patterns, and the probability with which each pattern is represented by the status variables present locally in all said nodes is determined in each of said nodes via the mean value of the logarithms for a respective pattern, wherein the respective pattern having a highest probability represents a detected pattern.

24. The communications network according to claim 15, wherein the first time slots are carrier sense multiple access time slots and the second time slots are time division multiple access time slots.

25. The communications network according to claim 15, wherein the communications network is a wireless communications network in which the nodes contain at least partially sensors which communicate with one another wirelessly.

26. The communications network according to claim 15, wherein the communications network is configured to be disposed in an automation plant, a power system, a traffic network or a combination of the automation plant, the power plant and the traffic network.

27. The communications network according to claim 15, wherein the communications network is a wireless sensor network in which said nodes contain at least partially sensors which communicate with one another wirelessly.

28. The communications network according to claim 15, wherein the respective node and the predetermined neighboring node are each a sensor node sensing at least one quality selected from the group consisting of a temperature and a brightness.

* * * * *